Feb. 9, 1954    J. A. HJULIAN    2,668,451
AUTOMATIC SHAFT REVERSER AND TORQUE GOVERNOR MACHINE
Filed Dec. 5, 1950    5 Sheets-Sheet 1

Feb. 9, 1954     J. A. HJULIAN     2,668,451
AUTOMATIC SHAFT REVERSER AND TORQUE GOVERNOR MACHINE
Filed Dec. 5, 1950     5 Sheets-Sheet 2

Feb. 9, 1954  J. A. HJULIAN  2,668,451
AUTOMATIC SHAFT REVERSER AND TORQUE GOVERNOR MACHINE
Filed Dec. 5, 1950  5 Sheets-Sheet 5

Patented Feb. 9, 1954

2,668,451

UNITED STATES PATENT OFFICE 2,668,451

AUTOMATIC SHAFT REVERSER AND TORQUE GOVERNOR MACHINE

Julius A. Hjulian, Palos Heights, Ill., assignor to Crane Co., Chicago, Ill.

Application December 5, 1950, Serial No. 199,299

13 Claims. (Cl. 74—323)

This invention relates to a valve testing machine or the like, and, more particularly, it pertains to an automatic shaft reverser and torque governor machine which is preferably employed in transmitting power from a given power supply source.

Upon reading the following disclosure, it will be apparent that the practical application of this invention is very extensive. However, for purposes of clarity in the understanding of this invention, a specific application of valve testing will be considered herein. The said application is concerned with the repeated operations of opening and closing a valve. The said operations in general may be said to simulate the actual service conditions to which the said valve may be subjected.

Thus, it is an important object of this invention to provide a machine which is adaptable to effect: the transmission of rotary motion to a valve stem or the like, wherein a predetermined valve closing torque may be applied to said valve stem, and whereupon said stem rotation will be automatically reversed for a predetermined number of revolutions after which the direction of said stem rotation is again automatically reversed while the power supply operates continuously in but one direction.

It is another object of this invention to provide a machine for transmitting continuous rotary motion and predeterminately limiting the torque on the driven shaft and also the number of revolutions in one direction of rotation of the driven shaft while the said machine is adjustable in these functions.

Another object is to provide a machine which will transmit rotary motion and automatically reverse without requiring the use of the usual electrical devices, such as relays, reversing switches, solenoids, and the like.

Still another object is to provide a machine which will transmit rotary motion and limit the shaft torque without damaging the machine by the use of shear keys or the like.

Other objects and advantages will become more readily apparent upon proceeding with the following description read in light of the accompanying drawings, in which

Fig. 2 is a front elevation view of the embodiment shown in Fig. 1.

Similar reference numerals refer to similar parts throughout the several views.

Figure 1:
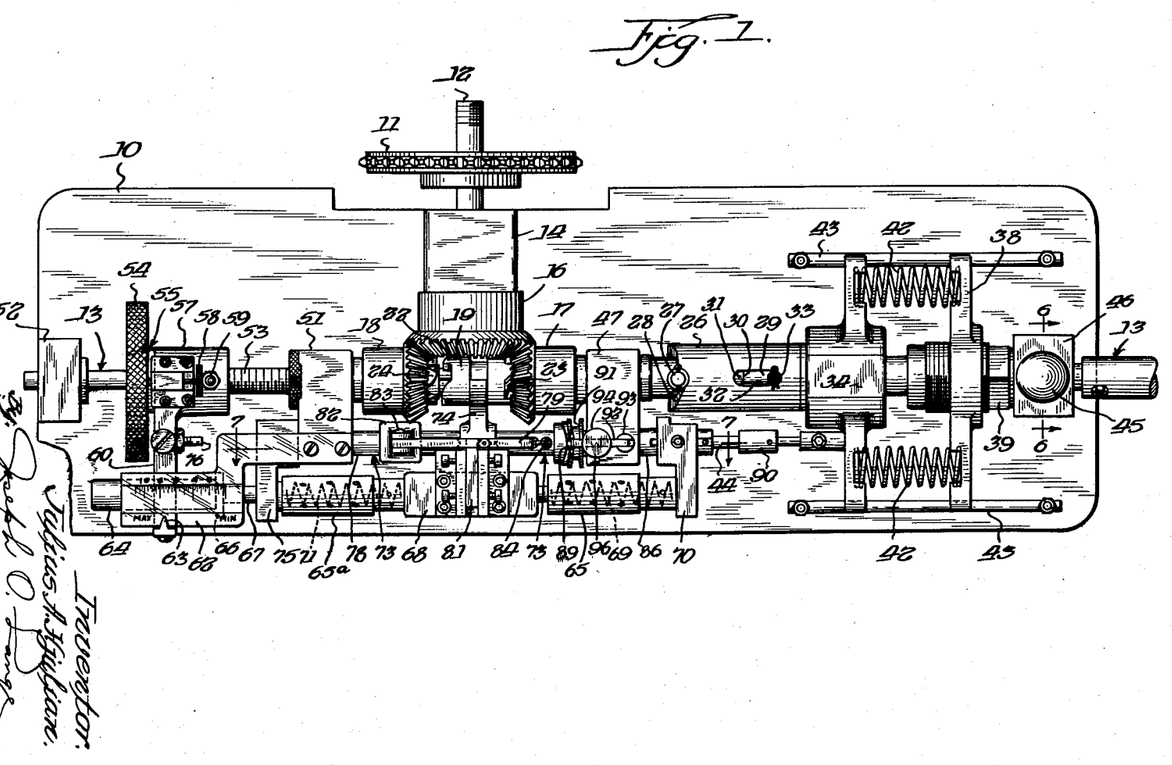
Fig. 1 is a plan view of a preferred embodiment of this invention.

As shown in Fig. 1, the machine consists essentially of a base plate 10 having suitable holes therethrough for bolting to a casing (not shown) or other support means which may enclose the entire mechanism if desired. A conventional power drive means (not shown) is preferably employed and may be geared with a gear or sprocket 11 preferably keyed onto a shaft 12 extending outside the said casing. The direction of rotation of the said drive means is of the usual practice as being in a direction to impart counterclockwise rotation to the sprocket 11 as seen in Fig. 2, while a shaft 13 of the machine extends from the said casing to suitably connect to a rotatable valve stem (not shown) and automatically reverses the direction of such stem rotation as desired and as hereinafter described. It should be here noted that the direction of rotation of sprocket 11 is determined by gearing, to be later described, and rotation of the valve stem will be assumed to be in accordance with standard practice, i. e., clockwise for closing when looking down on the valve.

Following through the motion of the said mechanism from the said drive means, a bearing 14 mounted on the base plate 10 supports the driven shaft 12. The latter member has a bevel gear 16 secured to the end thereof in a conventional manner. Two oppositely disposed bevel gears 17 and 18 constantly mesh with the bevel gear 16 and are mounted on the shaft 13 so as to be free to rotate relative thereto.

Mounted over the shaft 13, between the bevel gears 17 and 18, is a cylindrical double dog clutch member 19 having inner peripheral longitudinal grooves 21 (see Fig. 4) to receive corresponding splines 22 of the shaft 13 whereupon the dog clutch member 19 is axially moved by means hereinafter described. Driven clutch members 23 and 24, which are relatively non-rotatably mounted within bevel gears 17 and 18, respectively, may be separately engaged by the slidable dog clutch member 19, thus transmitting the drive power to the shaft 13 and thereby enabling the latter member to be rotated in either direction according to which one of the driven clutch members 23 and 24 is engaged.

Assuming that the driven clutch member 23 is engaged with the sliding clutch member 19, as is shown in Fig. 1, it will be apparent that the shaft 13 will rotate in one direction until a predetermined resisting torque is applied thereto. The said resisting torque may be the result of seating a valve closure member (not shown) which is reciprocated by the valve's stem being axially connected to the end of the shaft 13. The influence of the said resisting torque on the shaft 13 causes a sleeve 26 mounted thereon to move axially outward as two diametrically opposite end portions of a shaft roller pin 27 roll downwardly on two respective cam surfaces 28 located on the end of the sleeve 26. Note that reversed rotation of shaft 13 would provide a more definite drive between pin 27 and sleeve 26, since the pin is more definitely received on the upper side thereof by the sleeve cam surface which is notched. It should also be noted that a separation or clearance exists in the shaft 13 at a portion designated 30 within the sleeve 26 and thereby permits relative rotation between the sections of the shaft 13 when the resisting torque stops rotation of the end section, which is designated 29. Since the driving power is continuous, the opposite shaft section 31 continues to rotate, thereby causing the roller pins 27 to ride on the cam surfaces 28. Normal rotation of the shaft 13 is effected through the roller pins 27, the latter members being in relatively tight relation to bear against a notched portion of the cams 28 by means hereinafter to be described. Two diametrically opposite longitudinal slots 32 are provided in the sleeve 26 to receive a shaft pin 33, thereby allowing for the axial displacement of the sleeve 26 while transmitting rotation.

Figure 3:
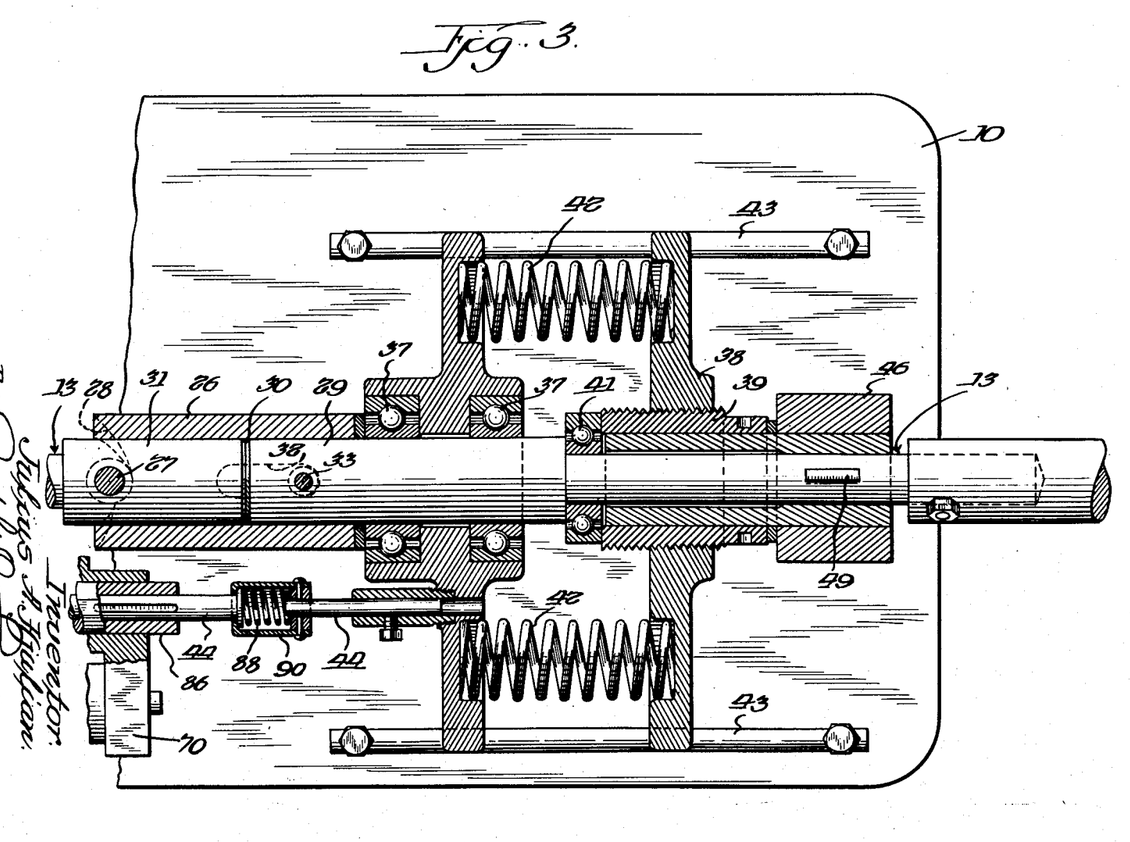
Fig. 3 is an enlarged fragmentary sectional plan view of an end portion of Fig. 2.

The outer end of the sleeve 26 abuts an axially movable non-rotatable yoke 34 mounted on the shaft 13 and having ball bearings 37 therein, as shown in Fig. 3. Another non-rotatable yoke 38 is threadedly mounted on the outer end of the shaft 13 and is preferably provided with the ball bearings 41. As shown in Figs. 1 and 3, two springs 42 of predetermined strength are disposed between the two yokes 34 and 38 which are supported upon two crossbars 43, the latter members being mounted on the base plate 10 under the ends of the yokes 34 and 38. Thus, under the influence of the springs 42, the yoke 34 is held inwardly against the sleeve 26 for the previously described reason of maintaining the sleeve 26 in driving relation with the section 31 of the shaft 13. When the sleeve 26 is moved outwardly as described, the yoke 34 moves outwardly, and also a rod 44 which is connected to the yoke 34 is axially moved to effect reversal of the shaft 13 by shifting the sliding clutch member 19 in a manner hereinafter described. It should be understood that the strength of the springs 42, against which the yoke 34 moves, determines the limit of the allowable resisting torque. The yoke 38 is mounted on the threaded bushing 39 which permits the axially adjustable positioning of the yoke 38, thereby providing for the desired tension adjustment of the springs 42. Also, the springs 42 may be easily removed from the yokes 34 and 38 and replaced by springs having a different strength characteristic if there is a need for a further change in the spring resistance.

Figures 5, 6:
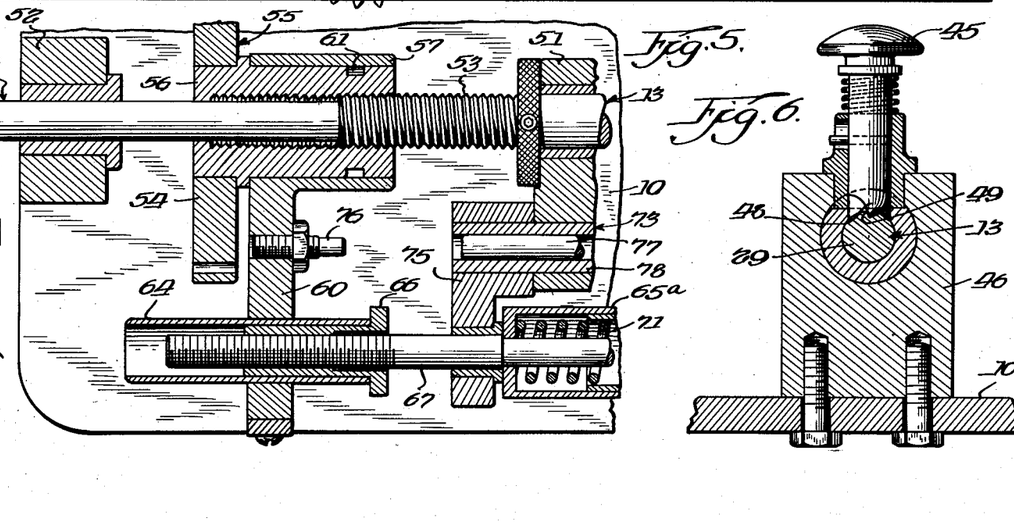
Fig. 5 is an enlarged fragmentary sectional plan view of an end portion of Fig. 2.
Fig. 6 is a fragmentary sectional view taken on a line 6—6 of Fig. 1.

The previously described end of the shaft 13 may be supported by conventional bearings 46 and 47 mounted on the base plate 10. Manual means of stopping the rotation of the shaft section 29 may, as best shown in Fig. 6, be provided in the bearing 46 where a spring loaded plunger 45 having an inner lug member 48 is forced downward to engage in a slot 49 on the shaft section 29, thereby preventing rotation of the latter member while the shaft section 31 rotates as the pin 27 merely rolls over the cams 28.

Referring now to the opposite end of the shaft 13, as shown in Figs. 1 and 2, suitable conventional bearings 51 and 52 are positioned on the base plate 10 to support this end of the shaft 13 which has a threaded portion 53. A dial 54, having an internally threaded sleeve 56 non-rotatably connected therewith (see Fig. 5), is mounted to cooperate with the shaft threads 53 and to reciprocate axially thereon. A cylindrical member 57 mounted over the sleeve 56 normally maintains the dial 54 in rotative relation with the shaft 13 by means of a spring loaded pin 58 which is mounted on the cylindrical member 57 to be received within holes in the outer rim of the dial 54. The cylindrical member 57 is held in non-rotative position by an arm 60 which extends therefrom, and member 57 is axially moved with the dial 54 by connecting thereto through a screw 59 in the member 57 and having an end received within a circumferential groove 61 in the sleeve 56 (see Fig. 5). Thus, the dial 54 may be adjustably positioned on the shaft 13 by withdrawing the pin 58 from a dial hole and screwing the dial sleeve 56 along the shaft 13. By the above mentioned adjustment, the exact number of shaft revolutions may be provided before reversal of the shaft 13 takes place. A more detailed description of the latter feature is hereinafter given. A scale 62 may be fixedly positioned to indicate, through a pointer 63 connected to the arm 60, the number of shaft revolutions before reversal thereof.

Continuing to analyze the operations of the mechanism, as the dog clutch member 19 is engaged with the driven clutch member 23, the dial assembly, generally designated 55, moves outwardly on the shaft 13 until the resisting torque is applied thereto. Since the said resisting torque reverses the direction of shaft rotation by shifting the clutch member 19 to engage with driven clutch member 24, the dial assembly 55 moves inwardly on the shaft 13. In a predetermined amount of inward movement, the arm 60 slides over a cylinder 64 until abutting a collar 66 on the inner end of the cylinder 64, as best shown in Fig. 5. The cylinder 64 is threaded on a rod 67 which extends through a mounting 68 of Fig. 1 and operates on two springs 69 and 71 which are within casings 65 and 65a, respectively, are thereby compressed by the inward movement of the dial assembly 55 by virtue of the construction shown in Fig. 4. The amount of spring compression may be adjusted by threadedly engaging the cylinder 64 along the rod 67 as apparent in Fig. 5, and a screw 72 shown in Fig. 2 is provided to extend through the collar 66 to interlock the two members 64 and 67 together. The springs 69 and 71 are preferably positioned within the telescoping casings 65 and 65a which contain apertures to prevent possible sluggish action of air compression or the like.

It should here be noted that a clutch actuator member 73 is supported by the bearings 47 and 51 and slides therein under the influence of the springs 69 and 71 in a manner hereinafter described. End portions 70 and 75 of the actuator member 73 are adjacent the outer ends of springs 69 and 71, respectively, and thereby position the member 73 by spring action. The central portion of the member 73 contains a guide 74 which contacts the sliding clutch member 19 to transmit the displacement of the member 73 to the sliding clutch member 19 while permitting free rotation of the clutch member 19. Thus, it will be understood that the action of the springs 69 and 71 provides for the positioning of the dog clutch member 19 and which affects the direction of rotation of the shaft 13.

In the inward limit of movement of the dial assembly 55, a pin 76 projecting from the arm 60 abuts a rod 77 (see Figs. 4 and 5) disposed within a sleeve portion 78 of the member 73. The pin 76 moves the rod 77 axially inward to release a catch 79 (see Fig. 8) which is pivotally mounted on the member 73 and secures the same against the influence of the springs 69 and 71 (see Fig. 1). An end of the catch 79 is received within a slotted shank 82 of member 73 of Fig. 7 where a pin 83 pivotally secures the catch to the shank 82. Thus, as shown in Fig. 1, the release of the catch 79 shifts the member 73 and the dog clutch member 19 under the extension of the spring 69, as hereinafter described. The clutch member 19, thus shifted, again engages the driven clutch member 23, and thereby reverses the rotation of the shaft 13.

Figure 4:
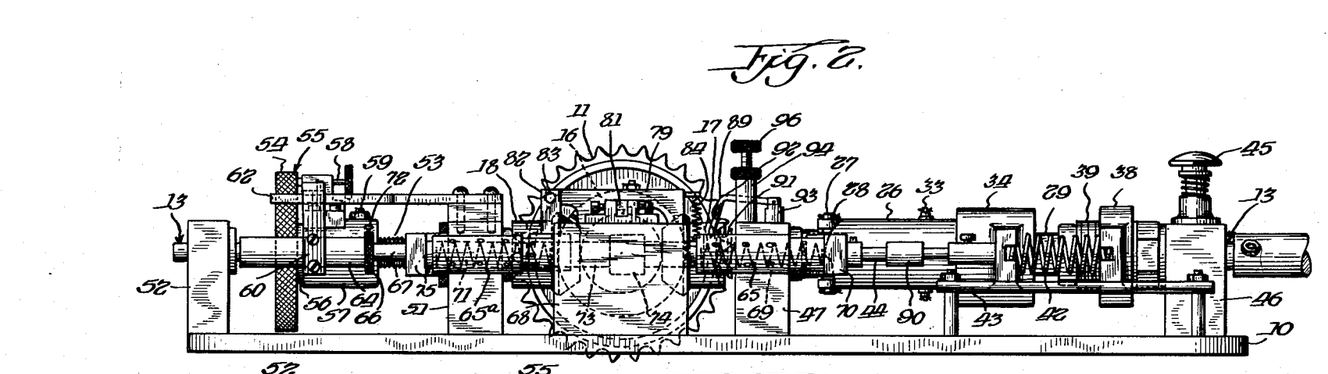
Fig. 4 is an enlarged plan fragmentary sectional view of an intermediate portion of Fig. 2.
Figure 7:
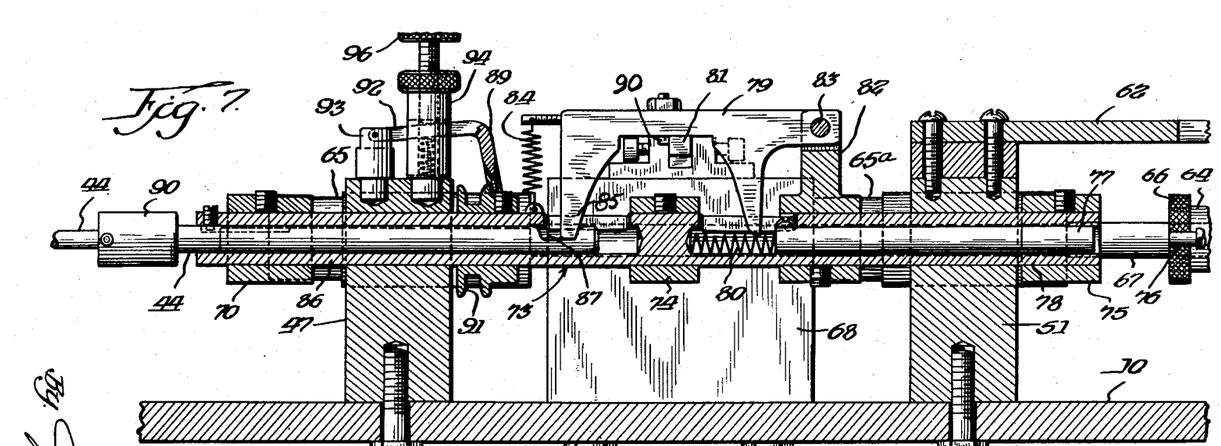
Fig. 7 is a fragmentary sectional view taken on a line 7—7 of Fig. 1.

The rod 77 of Fig. 4 is preferably spring loaded, by means of the spring 80 which is disposed within the sleeve 78, to effect the return thereof to the original position. Also, the catch 79 of Fig. 7 is spring loaded, by the spring 84 on the member 73, and thereby is yieldingly held downward while being supported in the lowest position by the bar 81 projecting from the mounting 68. When the catch 79 is returned to the downward position, the member 73 is thereby prevented from shifting to its previous position by a stop pin 90 projecting through the catch 79 to abut the bar 81. Thus, the spring 71 is maintained partially compressed by the spring abutting the end 75 of the member 73 when the dial assembly 55 has again moved outward.

The shaft 13 then rotates in the reversed direction which causes the dial assembly 55 to again move outwardly. After the predetermined number of revolutions of the shaft 13, the resisting torque becomes effective causing the rod 44 to move outwardly by the means previously described. An inward portion of the rod 44 is received within a sleeve portion 86 of the member 73, as shown in Fig. 7, and a groove 87 on the inner end of the rod 44 receives a downwardly projecting end 85 of the catch 79 which is secured against the influence of the springs 69 and 71 by means of the stop pin 90 abutting bar 81. Thus, the outward movement of the rod 44 lifts the catch 79 to permit the spring 71 of Fig. 1 to shift the member 73, and to place clutch 19 in engagement with driven clutch member 24.

The rod 44, as shown in Fig. 3, is provided with a spring 88 within a sleeve 90 and allows for relatively slight adjustments in the length of the rod 44. More particularly, the spring 88 effects an inward displacement of the groove 87 of Figs. 7 and 8 in the end limit of inward movement of the dial assembly 55 of Fig. 1. Thus, the action of the catch 79 is more rapid in relation to the movement of the outer end of the rod 44.

The sliding clutch member 19 may be locked in a neutral position, by means of a collar member 89 locking within transverse grooves 91 located on the member 73. The collar member 89 may be positioned on an extension 92 which is pivotally pinned on a shank 93 of the bearing 47 and projecting through a stem 94 on the said bearing. Fig. 7 shows screw 96 in the top of the stem 94 to abut the extension 92 thereby to adjustably secure the collar 89 downwardly in the grooves 91, while a spring in the stem 94, acting underneath the extension 92, normally supports the collar 89 upwardly out of engagement with the grooves 91.

In connection with setting the machine for a certain number of shaft revolutions, assuming that eight revolutions are desired in the opening or closing of a valve to be tested, the said valve is set in a closed position while the shaft stop plunger 45 of Fig. 1 is held downwardly as the dial assembly 55 moves outwardly by either the engagement of gear 17 with clutch member 19 or by the previously described positioning of dial 54 on shaft 13. When the scale pointer 63 indicates "8" on the scale 62, the plunger 45 is released, thereby providing for the application of the resistant torque of the seated valve and immediately reversing rotation to permit the said valve to open in the eight revolutions before the shaft 13 reverses for another eight revolutions when the pin 76 will trip catch 79 to again reverse the shaft 13. The above mentioned setting is thus permanently fixed for that particular test.

Figure 8:
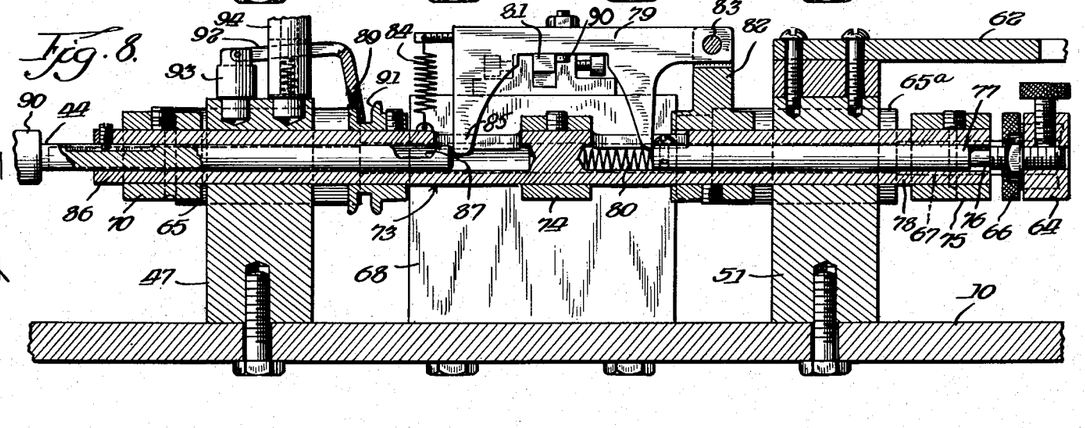
Fig. 8 is a fragmentary sectional view similar to the view shown in Fig. 7, but showing a different position of the device.

A summary of the shaft reversing operation is hereinafter given in connection with Figs. 7 and 8. Fig. 7 shows the details of the catch mechanism in a position of the machine as shown in Figs. 1 through 5. Fig. 8 shows the same section of the catch mechanism as that shown in Fig. 7, after the machine has operated to reverse the shaft.

Thus, in Fig. 7, the catch 79 is held downwardly by spring 84 to lock the catch and the actuating member 73 with the bar 81 through stop pin 90. Since catch 79 is connected to actuator member 73 through the common shank 82, actuator 73 is maintained in a set position with catch 79. In the view shown in Fig. 7, this set position secures member 73 to the left thereby providing the engagement of clutch member 19 with driven clutch member 23, as shown in Fig. 1.

As best shown in Fig. 1, upon predetermined operation with the above described setting, the previously mentioned resistant torque will become effective on shaft end 29 of shaft 13, thereby causing the roller pin 27 to roll down on cam 28, as seen in Fig. 1, as the shaft 31 continues to rotate. As in the previously described manner, the yoke 34 is thus outwardly displaced as is rod 44 which is connected thereto, and the following described spring loading or cocking and releasing, or trigger action, takes place.

Again referring to Fig. 7, rod 44 is thus displaced to the left, releasing catch 79, as groove 87 is withdrawn from the end 85 of catch 79, the stop pin 90 is caused to lift above bar 81. Under the previously arranged and described compression of spring 71, in casing 65a, the spring then acts against the actuator end 75 to shift the then released actuator 73 to the right as shown in Fig. 8. Catch 79 is again held downwardly by the spring 84 where the stop pin 90 then engages the bar 81 to secure the catch against displacement to the left.

The above described shifting of the actuator 73 positioned the clutch member 19 to engage with driven clutch member 24 and thereby reverse the rotation of shaft 13, as apparent in Fig. 1. The rotation of shaft 13 then actuates the dial mechanism 55 in an inward direction. As previously noted in connection with Fig. 4, inward movement of the dial mechanism 55 effects axially inward movement of rod 67 which compresses springs 69 and 71 within the casings 65 and 65a by shouldering on their respective casing end portions.

Continued inward movement of dial mechanism 55, positions pin 76 against rod 77 as shown in Fig. 8. It should here be apparent that further inward movement of pin 76 will force rod 77 against the catch 79 to release the latter by raising the stop pin 90 above the bar 81. Thus, the compression of spring 69 within casing 65 is released through the catch 79 which is connected to the actuator 73 and the latter is again displaced by the spring action. This time, the catch mechanism is returned to the position shown in Fig. 7.

The spring 71 in casing 65a is thus secured in a compressed position by the actuator 73 and the actuator end 75 being maintained in position by the catch 79.

The foregoing description of a valve tester device is most suitable for testing the valve packing, stem friction, and the like. If it is desired to test the closure member and seat for fluid tightness after a number of operations of the valve, a timing device, such as a repeating cycle timer can be connected to the power means of the electric motor to intermittently operate the said motor by providing for a shut-off of the motor when the valve is in the closed position. Thus, any leaks through the valve will be detected during the shut-off period of the motor. To synchronize motor shut-off with the closing of the valve, the said timing device can be electrically connected to the shiftable member 73, thereby to operate when member 73 is in a position corresponding to the closed position of the valve.

The above described arrangement of a timing device is of a conventional nature, and it is not deemed necessary to show it in the drawings, as it is only an electrical connection between the device of this invention and the electric motor used to drive the same.

It should be noted that the employment of a timing device, as described above, may require a lost motion connection between the shaft 13 and the valve stem connected thereto. Thus, the momentum of the machine and the driving motor after shaft reversal will be expanded in lost motion rather than transmitted to the valve after the latter has fully closed. Such a lost motion connection merely insures closing the valve under the predetermined torque as described above and prevents the machinery momentum from opening the valve after the motor is shut off by the timing device. This lost motion connection could consist of a running threaded connection between the shaft 13 and the valve stem having the threads on an intermediate sleeve which is provided with a keyway to permit the axial movement of the threaded connection.

It should be understood that there is herein provided an automatic shaft reverser and a torque limiter which operates off a constant driving force. Also, it should be apparent that the driving force may be applied to the machine while the driven shaft 29 is prevented from rotating and no damage will result. The latter provision is a desirable feature of the cam operation which allows one section 31 of the shaft 13 to rotate while the other section 29 is stationary.

Although this invention has been described in one preferred form, it should not be so limited, as it is susceptible to many changes without departing from the spirit of this application or the scope of the appended claims.

I claim:

1. A combination shaft reverser and torque governor machine, the combination comprising a separated shaft, a drive gear for the shaft, two oppositely disposed driven gears loosely mounted on said shaft to continuously mesh with the said drive gear, a double clutch member mounted intermediate the said driven gears, a sleeve mounted over the separated portion of the said shaft, resilient means cooperating with the said sleeve and connected to the said shaft to normally maintain the same in rotative relation, a cam surface on the said sleeve, a cam follower attached to the said shaft to effect axial displacement of the said sleeve, a slidable actuator member connected to the said clutch, a plurality of springs mounted to separately act on the said actuator member to move the same, means actuated by rotation of the said shaft to load the said springs, catch means to secure the said springs and be operable with predetermined rotation of the said shaft, and trigger means extending from the said sleeve to the said resilient means to release the catch means upon axial movement of the said sleeve.

2. A combination shaft reverser and torque governor machine comprising in combination, means for receiving rotary driving power, a separated shaft, a double clutch member mounted to reciprocably slide on the said shaft, two oppositely disposed driven gears loosely mounted on the said shaft to mesh separately with the said clutch member, a joining member connected to the said shaft to cooperate with the separated portions thereof and to transmit rotatable motion therebetween, cam means acting on the said joining member to further separate the said shaft sections when a predetermined resisting torque is applied to the said shaft, spring means acting on the said joining member for securing the said shaft sections in normal driving relation, a movable member attached to the said clutch member to operate the same, two springs mounted to act independently to position the said movable member, means actuated by rotation of the said shaft to compress the latter said springs, a catch mounted on the said movable member to secure the same in position against the compression of the said latter springs, means actuated by the said shaft rotation and means cooperating with the said cam action to alternately release the said catch.

3. An automatic shaft reverser and torque limiter machine comprising in combination, a separated shaft having a threaded portion at one end, two oppositely disposed gears loosely mounted on the said shaft, a driving gear in constant mesh with the said gears, double clutch means intermediate the said gears and splined to the said shaft, a sleeve mounted over said shaft separation, pin means on one section of said shaft to maintain the same in rotative relation with the said sleeve, a cam surface on the said sleeve, pin means on the said shaft to cooperate with the said cam, spring means to yieldingly urge the said sleeve against the latter said pin means, a slidable actuator member attached to said clutch, a second spring mounted to abut ends of the said actuator, threaded means cooperating with the said shaft threads to reciprocate thereon and to compress the latter of said springs, a catch to secure the said actuator against displacement, trigger means cooperating with the said threaded means and said sleeve to alternately release the latter of said springs.

4. A shaft reverser and torque governor machine comprising in combination, a shaft having a threaded portion, oppositely disposed gears loosely mounted on the said shaft, double clutch means intermediate the said gears, a drive gear in continuous mesh with the said gears, a second shaft axially aligned with the said first shaft, a sleeve attached to the said second shaft, a cam surface on the said sleeve, a pin on the said first shaft to abut the said cam, spring means to maintain the said sleeve in driving relation against the said pin, an actuator member attached to said clutch means and slidable therewith, two separately operable springs disposed to position said actuator, a threaded member mounted on the threaded section of the said first shaft to move axially thereon and having means to compress the said two springs upon predetermined rotation of said shaft, a catch to maintain the said springs in compressed relation, trigger means cooperating separately with the said sleeve and the said threaded member to release the said catch upon predetermined axial movement of the said sleeve and said threaded member.

5. A combination automatic torque limiter and shaft reverser device comprising in combination, a separated shaft having a threaded portion thereon, oppositely disposed gears loosely mounted on the said shaft, a driving gear in constant mesh with the said gears, a double clutch member splined to said shaft intermediate the said gears, a sleeve member having at least one longitudinal slot therein, a cam surface on one end of said sleeve, a pin in one section of said shaft abutting said cam surface, a second pin received within the said sleeve slot for securing the said sleeve to the other section of said shaft, resilient means for yieldingly retaining the said sleeve against the said first pin, a threaded sleeve mounted on said shaft threaded portion to reciprocate thereon, a slidable member attached to the said clutch member, other resilient means mounted to separately influence the position of the said slidable member, rod means abutting the said other resilient means and connected to the said threaded sleeve, a latch mounted to act against the said resilient means, trigger means cooperating independently with the said first-named sleeve member and said threaded sleeve to alternately release said latch.

6. The subject matter of claim 5, including a scale graduated to correspond with the number of shaft revolutions, indicator means cooperating with the said threaded sleeve and terminating on the said scale.

7. A combination automatic shaft reverser and torque governor mechanism comprising a sectional shaft having a threaded portion, a pair of oppositely disposed gears mounted on said shaft, a third gear in continuous mesh with the said first-named gears, a double-faced clutch member intermediate the said first-named gears and in driving relation to the said shaft, a joining sleeve mounted over the said shaft to be non-rotatably connected to one section thereof, a cam surface on the said sleeve, spring means for yieldingly maintaining said cam surface to abut the other section of said shaft, a threaded member mounted on the said shaft threaded portion to reciprocate thereon, a slidable actuator member attached to said clutch member, two springs disposed to separately affect the position of said actuator, a rod attached to said threaded member to compress latter said springs, catch means mounted on said actuator to secure the same against spring action, a second rod attached to said threaded member to release the said catch means, and a third rod attached to said sleeve to selectively release the said catch means.

8. An automatic shaft reverser and torque governor machine comprising in combination, a sectioned shaft having a threaded portion, two oppositely disposed gears loosely mounted on said shaft, a third gear in constant mesh with said two gears, a double clutch member intermediate the said two gears, a sleeve mounted over the shaft to be non-rotatable with one section thereof, a cam surface on said sleeve, means on the opposite section of said shaft to cooperate with said cam, spring means acting on said sleeve to yieldingly maintain said shaft sections together, a slidable actuator attached to said clutch member, a resilient means mounted to alternately displace said actuator axially, a threaded sleeve to reciprocate on said shaft threaded portion, a rod attached to said threaded sleeve to load the latter said resilient means upon inward movement of said threaded sleeve, a catch mounted on said actuator to secure the same against the force of latter said resilient means, trigger means alternately operative with said threaded sleeve and with the said shaft sleeve to release said catch.

9. The subject matter of claim 4, including shaft stop means operable on said second shaft whereby the machine is adjustably set in relation to the respective members operative with said first and second shafts.

10. The subject matter of claim 8, including locking means operative on said actuator to maintain the latter with said clutch member in a neutral position of gear engagement.

11. An automatic shaft reverser and torque limiter machine comprising in combination, a separated shaft having a threaded portion at one end, two oppositely disposed gears loosely mounted on the said shaft, each gear having a bevel gear and an integral driven clutch member, a bevel driving gear in continuous mesh with the said bevel gears, a double dog clutch member intermediate the said driven clutch members and splined to the said shaft to alternately drive said shaft through said dog clutch member, a sleeve mounted over said shaft separation and having an axial groove therein, pin means on one section of said shaft to engage said sleeve groove and thereby maintain the shaft in rotative relation with the said sleeve, a cam surface on the said sleeve, cam follower means on the said shaft to cooperate with the said cam, spring means cooperating with said sleeve to yieldingly urge the latter against said cam follower means, a slidable actuator member attached to said clutch member, a spring mounted to abut each end of the said actuator, threaded means cooperating with the said shaft threads to reciprocate thereon with shaft rotation and thereby compress the latter said springs upon suitable reciprocable movement, a catch to secure the said actuator against displacement when under spring load, trigger means cooperating with the said threaded means and said sleeve to alternately release the latter said springs whereby said actuator is displaced and thus said clutch member is shifted to engage the opposite of said driven clutch members.

12. A shaft reverser and torque governor machine comprising in combination, a shaft having a threaded portion, two oppositely disposed gears loosely mounted on the said shaft, each of said gears including a bevel gear and a driven clutch member, a double clutch member intermediate the said gears to alternately engage said driven clutch members, a drive gear in continuous mesh with the said bevel gears, a second shaft axially aligned with the said first shaft, a sleeve having an axial groove therein, a pin extending from said second shaft to engage said sleeve groove in driving rotative relation, a cam surface on the said sleeve, a pin on the said first shaft to abut the said cam, spring means to maintain the said sleeve in driving relation against the said pins, a clutch actuator member attached to said clutch member and slidable therewith, two separately operable springs disposed to position said actuator, a threaded member mounted on the threaded section of the said first shaft to move axially thereon and having means to compress the said two springs upon predetermined rotation of said shaft, a catch to maintain the said springs compressed, trigger means cooperating separately with the said sleeve and the said threaded member to release the said catch upon predetermined axial movement of the said sleeve and said threaded means.

13. An automatic shaft reverser and torque governor machine comprising in combination, a sectioned shaft having a threaded portion, two oppositely disposed gears loosely mounted on said shaft, each of said gears including a bevel gear and a driven clutch member, a third gear in constant mesh with said two bevel gears, a double dog clutch member splined to said shaft and intermediate the said two gears to alternately engage said driven clutch members, a sleeve mounted over the shaft to be non-rotatable and axially movable relative to one section of said shaft, a cam surface on said sleeve, means on the second section of said shaft to cooperate with said cam, spring means acting on said sleeve to yieldingly maintain said shaft sections together in driving relation under a predetermined limited torque, a slidable clutch actuator attached to said clutch member, at least two springs mounted to oppositely abut said actuator, a threaded sleeve to reciprocate on said shaft threaded portion, a rod attached to said threaded sleeve to compress said latter springs upon inward movement of said threaded sleeve, a catch mounted on said actuator to secure the same against the efforts of said latter springs, trigger means alternately operative with respective movement of said threaded sleeve and said shaft sleeve to release said catch and thereby displace said clutch to change engagement of said driven clutch members to reverse rotation of said shaft.

JULIUS A. HJULIAN.

References Cited in the file of this patent

UNITED STATES PATENTS

| Number | Name | Date |
|---|---|---|
| 747,056 | Felsing | Dec. 15, 1903 |
| 866,776 | Crell | Sept. 24, 1907 |
| 1,232,779 | Ewart | July 10, 1917 |
| 1,404,166 | Seege | Jan. 17, 1922 |
| 1,641,392 | Lippert | Sept. 6, 1927 |
| 1,881,633 | Johnson | Oct. 11, 1932 |
| 2,506,052 | Zimarik | May 2, 1950 |
| 2,515,291 | Brown | July 18, 1950 |
| 2,531,838 | Bergemann | Nov. 28, 1950 |